(12) United States Patent
Ragogna et al.

(10) Patent No.: US 9,356,542 B2
(45) Date of Patent: May 31, 2016

(54) METHOD OF OPERATING A VARIABLE SPEED MOTOR IN A LAUNDRY TREATMENT APPARATUS

(71) Applicant: Electrolux Appliances Aktiebolag, Stockholm (SE)

(72) Inventors: Roberto Ragogna, Malnisio (IT); Christian Montebello, San Giovanni Teatino (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 14/478,574

(22) Filed: Sep. 5, 2014

(65) Prior Publication Data
US 2015/0069933 A1    Mar. 12, 2015

(30) Foreign Application Priority Data

Sep. 10, 2013  (EP) .................................... 13183791

(51) Int. Cl.
| | |
|---|---|
| *H02P 5/00* | (2006.01) |
| *D06F 33/02* | (2006.01) |
| *D06F 37/30* | (2006.01) |
| *D06F 58/28* | (2006.01) |
| *D06F 58/20* | (2006.01) |
| *D06F 25/00* | (2006.01) |

(52) U.S. Cl.
CPC *H02P 5/00* (2013.01); *D06F 33/02* (2013.01); *D06F 37/304* (2013.01); *D06F 58/206* (2013.01); *D06F 58/28* (2013.01); *D06F 25/00* (2013.01); *D06F 2058/287* (2013.01); *D06F 2058/2854* (2013.01); *D06F 2058/2864* (2013.01); *D06F 2058/2877* (2013.01); *D06F 2202/04* (2013.01); *D06F 2202/12* (2013.01); *D06F 2204/065* (2013.01)

(58) Field of Classification Search
CPC ........................................................ H02P 5/00
USPC ............................................ 318/105, 34, 558
See application file for complete search history.

(56) References Cited

U.S. PATENT DOCUMENTS

| | | | | |
|---|---|---|---|---|
| 7,504,784 | B2* | 3/2009 | Asada ................... | D06F 37/304 318/400.02 |
| 8,461,783 | B2* | 6/2013 | Navarra et al. ..................... | 318/8 |
| 8,536,810 | B2* | 9/2013 | Yamada ................. | H02P 27/04 318/400.09 |
| 8,649,923 | B2* | 2/2014 | Sankaran ................ | B60L 15/02 180/65.285 |

FOREIGN PATENT DOCUMENTS

| | | | |
|---|---|---|---|
| EP | | 1760184 A2 | 3/2007 |

* cited by examiner

*Primary Examiner* — David S Luo
(74) *Attorney, Agent, or Firm* — Banner & Witcoff, LTD.

(57) ABSTRACT

A method of operating a laundry treatment apparatus, in particular a washing machine, a laundry dryer, a heat pump laundry dryer or a washing machine having a drying function, is provided. The apparatus includes a control unit controlling the operation of the treatment apparatus, a laundry treatment chamber for treating laundry, a detector unit for detecting at least one operation parameter (T_inv) of the treatment apparatus, and a first variable speed motor unit adapted at least to drive the treatment chamber, and/or a compressor having a second variable speed motor unit for circulating a refrigerant fluid through a refrigerant loop of the laundry treatment apparatus. The method includes selecting a predetermined power supply modulation mode for operating at least one of the first and second motor unit in dependency of the at least one detected operation parameter (T_inv), and operating at least one of the first and second motor units in an operating cycle by applying or executing the selected predetermined power supply modulation mode.

18 Claims, 6 Drawing Sheets

METHOD OF OPERATING A VARIABLE SPEED MOTOR IN A LAUNDRY TREATMENT APPARATUS

CROSS-REFERENCE TO RELATED APPLICATION

This application claims priority to European Application No. 13183791.6, filed on Sep. 10, 2013, the content of which is hereby incorporated by reference in its entirety.

BACKGROUND OF THE INVENTION

The invention relates to a method of operating a laundry treatment apparatus comprising at least one variable speed motor unit.

EP 1 760 184 A2 discloses a method of controlling a motor unit of a washing machine. In case that a high speed rotation of the motor unit is required, the motor unit is operated in a three phase mode for a specified period to get a lower noise, and in case that a low speed rotation is required, the motor is operated in a two phase mode at least for a specified period to get a higher torque.

It is an object of the invention to provide an improved method of operation a laundry treatment apparatus.

According to an aspect of the invention, a method of operating a laundry treatment apparatus, in particular a washing machine, a laundry dryer, a heat pump laundry dryer or a washing machine having a drying function is provided. The treatment apparatus comprises a control unit controlling the operation of the treatment apparatus, a laundry treatment chamber for treating laundry, a detector unit for detecting at least one operation parameter of the treatment apparatus, and a first variable speed motor unit adapted at least to drive the treatment chamber. The first motor unit may be adapted to drive additionally a process air fan unit for circulating process air through laundry treatment chamber. Alternatively or additionally a compressor is provided having a second variable speed motor unit for circulating a refrigerant fluid through a refrigerant loop of the laundry treatment apparatus.

The method comprises selecting a predetermined power supply modulation mode for operating the first and/or second motor unit in dependency of the at least one detected operation parameter of the treatment apparatus. Subsequently the first and/or second motor units are operated in an operating cycle by applying or executing the selected predetermined power supply modulation mode.

When using a variable speed motor unit, a considerable amount of heat may be generated on an inverter board adapted to control the motor speed. A motor control power module may have to dissipate heat in the order of tens of Watts. Heat dissipation may be provided by a heat sink formed e.g. as an Aluminum finned block attached to the inverter board. This could be critical when confined spaces do not allow mounting of an inverter board having a well dimensioned heat sink. An even more critical situation may occur in a laundry dryer, where the temperature of the ambient where the motor control is installed could reach and exceed 60° C. Thus it is desirable to reduce or limit heat generation during apparatus operation.

Depending on the applied operation mode, heat generation on an inverter board may be reduced during apparatus operation. Thus, by adapting the modulation mode and thereby the amount of heat generated during operation of (one of) the first/second motor unit, an improved method of limiting electronic board/components temperature during apparatus operation is provided. In particular, the above described method provides that the operation mode of at least one of the first or second motor unit is adapted to the present requirements or state (detected by the operation parameter) of the treatment apparatus.

The first and/or second variable speed motor unit can be operated in at least two operation modes which are different from each other. The 'different' from each other does not relate to different motor speeds that are controllably adjusted, but to different characteristics of applying power from the electronic board/inverter to the motor—which are for example 'different' although the motor speed set by the control are the same. More preferably the at least two operation modes are different in such a way that the energy loss in the electronic board/inverter supplying the power to the motor is different in a first operation mode and in a second operation mode. For example the energy loss has a first value in the first operation mode and the energy loss has a second value in the second operation mode which is lower than the first value. And/or variations of the motor torque (and thus operation noise emission) is lower in the first operation mode than in the second operation mode. Preferably the first and second operation modes are PWM modes having different control characteristics.

For example the at least one operation parameter may be detected repeatedly during apparatus operation, such that the power supply modulation mode is continuously adapted to the present state of the apparatus. Alternatively the at least one operation parameter is detected only at the beginning or start of an apparatus operation cycle wherein the power modulation mode selected in the following may be applied throughout the executed operation cycle, e.g. drying cycle. For example a detected operation parameter may be a drying program option button (e.g. "ECO") which is pushed by a user. Subsequently, an energy-saving power supply modulation mode may be selected in the case of selected option "ECO" which is applied throughout the selected and executed apparatus operation program.

Another example for the at least one detected operation parameter is an on-board temperature of a drum drive electronic board or compressor electronic board, i.e. an electronic board comprising the inverter. In particular the operation parameter may be a combination of the on-board temperature of the first motor unit (drum drive) electronic board and the second motor unit (compressor) electronic board (or of another two electronic boards). For example the detected operation parameter is the higher or rated higher temperature of the drum drive and compressor electronic board or is weighted temperature value of the drum drive electronic board and compressor electronic board. E.g. (a*T_compressor+b*T_drum motor)/2 with a+b=1.

For example motor control may be implemented using a three-phase inverter which allows a high motor efficiency. An inverter motor control is able to drive a motor using different signals that depend on the modulation mode used by the control algorithm to apply the power to the motor. In order to vary the motor speed, a three-phase inverter comprises six switches that can be driven according to a pulse-width modulation (PWM) technique. A PWM signal is a squared wave having a variable duty cycle. 'Duty cycle' is defined as the proportion of switch 'ON' time to the regular interval or 'period' of time. Preferably at least two predetermined modulation modes which are different of each other are available for driving at least one of the first and second variable speed motor unit.

Preferably a selectable first power supply modulation mode is a continuous PWM mode and a selectable second power supply modulation mode is a discontinuous PWM mode. Alternatively a first power supply modulation mode is a PWM mode in which the pulse modulation results in essentially a continuous power supply to each of the motor windings and a second power supply modulation mode is a PWM mode in which the pulse modulation results in temporal discontinuities in the power supply to at least one or each one of the motor windings.

Continuous PWM modulation allows creating a better current waveform for the motor unit, with a reduced harmonic content over the fundamental at the cost of a greater power heating dissipation on inverter components.

Discontinuous PWM modulation, conversely, can significantly reduce the heat produced (and consequently also the dimensions of the heat sink needed) but it introduces motor noise and a certain amount of harmonic content that can imply on a not perfectly sinusoidal current and consequent torque ripple on the motor, i.e. a periodic increase or decrease in output torque as the output motor shaft rotates. When a motor unit is operated by discontinuous modulation, the reduction of heat produced by the inverter is due to the fact that each switch stays closed for a longer time compared to the continuous modulation. Since the power losses are due to current conduction across the switch plus the losses due to the OFF/ON and ON/OFF commutation of the switch, when a discontinuous modulation is operating, the commutation losses are reduced compared to the continuous modulation and therefore the overall power losses are reduced. The theory shows how discontinuous modulation allows reducing heat dissipation need till a 50%. Thus the apparatus energy efficiency can be increased by selecting a predetermined modulation mode in dependency of the detected operation parameter. Further, by operating the first and/or second motor unit in discontinuous modulation mode heat generation during apparatus operation is reduced. Consequently heat dissipation means like a heat sink may be smaller which saves space in the apparatus housing.

If the treatment apparatus is directed to a heat pump laundry dryer, the (compressor) second variable speed motor unit circulates a refrigerant fluid through a refrigerant loop of a heat pump system of the heat pump dryer, wherein the refrigerant loop comprises: an expansion device, a first heat exchanger, the compressor and a second heat exchanger.

Preferably a first modulation mode is selected when the apparatus operation parameter is below a first threshold value and a second modulation mode is selected when the apparatus operation parameter is equal to or higher than the first threshold value. For example, if the operation parameter is less than the first threshold value, the first and/or second motor unit is driven through usual continuous modulation mode, whereby torque ripple on the motor is prevented and less noise is generated during operation. In case the detected operation parameter exceeds the first threshold value, the first and/or second motor unit is driven using discontinuous modulation. In this case the aim is to reduce heat dissipation need and to avoid, or at least delay the need of activating an optional cooling fan. When using the discontinuous modulation the noise of the motor increases a little bit, but in this way an optimum energy performance of the apparatus is ensured.

According to a preferred embodiment, the control unit comprises an electronic board having an inverter electronic supplying controlled current to the first or second motor unit according to the selected modulation mode.

Preferably the at least one motor unit is switched-off, when the (first) or a (second) detected apparatus operation parameter is above a second threshold value. In particular a switch-off may depend on an operation parameter different to the above described operation parameter. In case the second threshold value (switch-off threshold) is exceeded the first/second motor unit (and/or the motor control) is switched-off to avoid exceeding a temperature limit for electronic board and components, i.e. to prevent damage of electronic board components.

The apparatus may comprise a cooling fan unit for cooling an electronic board of the treatment apparatus by blowing cooling air towards the electronic board and/or by circulating air within the apparatus cabinet whereby the electronic board is cooled by the cooling air. The cooling fan unit may be activated when the or a detected apparatus operation parameter is above a third threshold value (fan threshold). In particular the electronic board may be a power supply board for operating the first motor unit (laundry treatment chamber motor) and/or process air motor (both may be one motor) and/or the electronic board for the second motor unit (refrigerant compressor motor). In particular the electronic board comprises an inverter control or is an inverter. For example the cooling fan unit may be a compressor cooling fan unit, which additionally cools down an inverter circuit.

When the operation parameter exceeds the third threshold value, the cooling fan unit is activated to prevent that a switch-off threshold (second threshold value) is exceeded. In other words the second threshold value has a higher value than the third threshold value. In case that the first and second (or more) variable speed motor units have first and second (or more) electronic boards, one board control may be master in view of the detected operation parameter, such that cooling of one board under the control criteria of this one board results in corresponding slave-cooling of the other board(s).

Preferably the selection of a modulation mode for operating at least one motor unit in dependency of the at least one detected operation parameter is started/initiated/enabled depending on one or more of the following parameters: an apparatus operation parameter T_inv; a drying program selector position; a program option selection; a drying program step; a drying process parameter; a laundry status; an ambient temperature; a time elapsed from the beginning of a laundry treatment cycle; a working parameter of the laundry treatment chamber, in particular laundry drum; a working parameter of a process air fan; a working parameter of a heat pump system; a motor unit working parameter; a user selection; a previous operation time of the laundry treatment apparatus; and an electrical parameter of the treatment apparatus power supply. Additionally or alternatively the value or level of the first, second and/or third threshold value is adjusted depending on one or more of the above mentioned parameters.

Examples of motor unit working parameters on basis of which the selection of a predetermined modulation mode is started/initiated/enabled are: current, voltage, phase, power consumption. Another option is that the motor unit (which provides the working parameters) may be not only the motor unit on which the discontinuous/continuous modulation is to be enabled, but it could be a second motor unit that may cause a change on a drying process parameter. E.g. a working parameter of the second motor unit (compressor motor) may start/initiate/enable a modulation mode selection for the first motor unit (drum motor).

An electrical parameter of the machine power supply may be current, voltage, frequency, and/or phase.

A laundry status may be laundry weight at the beginning of the drying program and/or actual laundry weight during drying program, a dryness/humidity level of the laundry, and/or the type of fabric (e.g. selected by a user "COTTON", "WOOL").

A drying process parameter may be a drying air temperature, a drying air pressure, an air flow rate, a drum and/or compressor speed, a desired final laundry humidity.

A program option selection may be for example "FAST" (shortened cycle duration), "ECO" (low energy consumption).

According to an embodiment, when the value of motor speed of the first/second motor unit is above a fourth threshold value or within a predetermined value range, the selection of a predetermined modulation mode for operating at least one motor unit in dependency of the at least one detected operation parameter is initiated/started. When the value of motor speed of the first/second motor unit is below the fourth threshold value or outside the predetermined value range, the first/second motor unit is operated in an initial modulation mode, in particular in continuous PWM mode.

Preferably the control by selection between the first and second operation parameter in dependency of the at least one operation parameter is enabled only, if a starting condition imposed on motor speed is verified. This is to avoid that a control unit driving the apparatus can call the inverter to change the motor control e.g. from the first power supply modulation mode (e.g. continuous modulation) to the second power supply modulation mode (e.g. discontinuous modulation) when the motor rotates below a predetermined speed. Below a predetermined motor speed the quality of motor control may decrease a lot. For example, only when the motor speed reaches or exceeds 1200-1300 rpm (i.e. the fourth threshold value), the operation parameter is detected and a corresponding modulation mode selected as described above for operating the first and/or second variable speed motor unit. Consequently, when the fourth threshold value is not reached or exceeded, the motor unit is driven in its initial (or presently used) modulation mode.

Preferably the detected operation parameter indicates at least one of the following: i) an operating state of an electronic board, e.g. a temperature of the electronic board, wherein the electronic board may comprise the inverter control, ii) an operating state of a heat pump system of the treatment apparatus, e.g. a refrigerant temperature, or iii) a temperature state of the treatment apparatus, e.g. an ambient/cabinet temperature.

According to a preferred embodiment, the at least one operation parameter is detected using a secondary operation parameter of an electronic board indicative of the at least one operation parameter. The at least one detected operation parameter may be an electronic board temperature, a motor temperature detected via the electronic board, and a current delivered by the electronic board to a motor exceeding a threshold value or exceeding a threshold averaged value. The secondary operation parameter (which is actually detected and which is indicative of the at least one operation parameter on basis of which the modulation mode is selected) may include one or more of: a voltage detected on the electronic board, a power or an averaged power provided by the electronic board, a current detected on the electronic board, and a voltage ratio detected on the electronic board. In particular the voltage, current and/or power for driving a or the motor unit.

Further, the detected operation parameter may be selected from one of the following variables: a temperature signal of an electronic board of the control unit, a temperature signal of a refrigerant circulating in a heat pump system, a temperature signal indicative of an ambient or environment temperature of the laundry treatment apparatus, or a combination of the afore mentioned temperature signals.

Preferably the at least one or the at least two detected temperature signals correspond to a temperature detected at one of the following positions: an electronic board or inverter position of an electronic board or inverter controlling a component of the heat pump system, an electronic board or inverter position of an electronic board or inverter controlling a motor for driving the laundry treatment chamber being a drum, a refrigerant fluid outlet position at the first or second heat exchanger, a refrigerant fluid outlet position at the compressor, the compressor, the expansion device, or a position in the air flow of the process air. I.e. the at least two temperature signals may be detected at a plurality of different positions, whereby a detailed picture of the (temperature) state of the apparatus is provided.

Further, according to the invention, another method of operating a laundry treatment apparatus, in particular a washing machine, a laundry dryer, a heat pump laundry dryer or a washing machine having a drying function, is provided. Unless otherwise mentioned, the elements, features and embodiments of the above described first method may be applied individually or in any arbitrary combination to the another method described in the following and vice versa.

In particular, the apparatus comprises a control unit controlling the operation of the treatment apparatus, a program or program option selection unit, a laundry treatment chamber for treating laundry, a detector unit for detecting at least one operation parameter of the treatment apparatus, and a variable speed motor unit adapted to drive a motor with a variable speed, wherein the variable speed motor unit is adapted to drive the motor by applying a first power supply modulation mode and applying at least a second power supply modulation mode, wherein the modulation type of the first and second power supply modulation mode are different of each other.

According to the method and in dependency of the selected program or program option or in dependency of the at least one apparatus operation parameter, the control unit is adapted to: i) disable the second power supply modulation mode such that it cannot be applied by the variable speed motor unit, or ii) disable all power supply modulation modes except the first power supply modulation mode such that the variable speed motor unit can only apply the first power supply modulation mode. For example, a drying program option "ECO" (energy-saving cycle) is selected by a user. Subsequently, an energy-saving power supply modulation mode is selected, which is applied throughout the selected and executed apparatus operation program.

In an embodiment, a program and/or program option selection unit for user input may be provided, e.g. input panel with selectors and/or switches and/or touch buttons. For example the selected program or program option is or is determined by one or more of: a drying program selector position; a program option selection; a user laundry type selection; a user selected noise reduction option; and a user selected laundry load selection.

For example the value(s) of the thresholds could be set such that only discontinuous modulation is selected (under "normal" ambient conditions of the apparatus, e.g. ambient temperature 20-30° C.). The first threshold value may be set at a value lower than 10° C. Under "normal" conditions a detected operation parameter (e.g. a temperature value of the treatment apparatus) would always be above the low first threshold value, such that generally e.g. discontinuous modulation would be selected. This embodiment could be used for example when i) the treatment apparatus starts operation on a more stressing environment (e.g. high temperature, or cycle start just after another one), ii) a large amount of laundry has been detected (e.g. 9 kg, 100% wet), or iii) an alarm of motor control heat sink temperature has been generated (i.e. heat generation has to be minimized).

Preferably there is a first group of programs in which the variable speed motor unit can be operated selectable with the first or second power supply modulation mode and there is a second group of programs which is exclusively operated in only on e of the supply modulation modes. In this context a group of programs means at least one program. Preferred at least two programs and/or options have to be selected. In particular under "normal" operation conditions the control unit and/or the variable speed motor unit is "free" in its control to switch between the first and the second mode, wherein this "freedom" is restricted by the described another control method. This restriction may be fully applied as an embodiment to the above method of parameter control according to claim 1 and embodiments thereof.

An example for enabling modulation change only in relation to a specific cycle or user selected option is the selection of a silent (night) cycle option. It would not be reasonable to select discontinuous modulation on the silent (night) cycle option, as discontinuous modulation causes an increase of motor noise. Since the general noise of the machine in a silent cycle option is lower, it could be more probable that a user could sense a "strange noise" from the motor. So in this case, to limit the temperature, fan cooling could be used exclusively.

Preferably the (first) variable speed motor unit may be motor unit adapted at least to drive the treatment chamber, and/or a second variable speed motor unit for operating a compressor circulating a refrigerant fluid through a refrigerant loop of the laundry treatment apparatus.

The above described apparatus operation parameter of any of the embodiments may be one or more of the following: a drying program step; a drying process parameter; a laundry status, e.g. the laundry humidity, the laundry load and/or the laundry type; an ambient temperature; a time elapsed from the beginning of a laundry treatment cycle; a working parameter of the laundry treatment chamber, in particular laundry drum; a working parameter of a process air fan; a working parameter of a heat pump system; a motor unit working parameter; a previous operation time of the laundry treatment apparatus; and an electrical parameter of the treatment apparatus power supply.

BRIEF DESCRIPTION OF THE DRAWINGS

Reference is made in detail to preferred embodiments of the invention, examples of which are illustrated in the accompanying figures, which show:

FIG. 2 a block diagram for the control of some components of the laundry treatment apparatus of FIG. 1, FIG. 3 a flow chart of a method for operating a variable speed unit of the treatment apparatus of FIG. 1 implemented by the control unit according to a first embodiment, FIG. 4 a flow chart of a method for operating a variable speed unit of the treatment apparatus of FIG. 1 implemented by the control unit according to a second embodiment, FIG. 5 a flow chart of a method for operating a variable speed unit of the treatment apparatus of FIG. 1 implemented by the control unit according to a third embodiment, FIG. 6 diagrams illustrating an exemplary continuous PWM mode, FIGS. 7a-b diagrams illustrating an exemplary discontinuous PWM mode, and FIG. 8 diagrams illustrating a modulation mode change from continuous PWM to discontinuous PWM.

DETAILED DESCRIPTION OF EXAMPLE EMBODIMENTS

Figure 1:
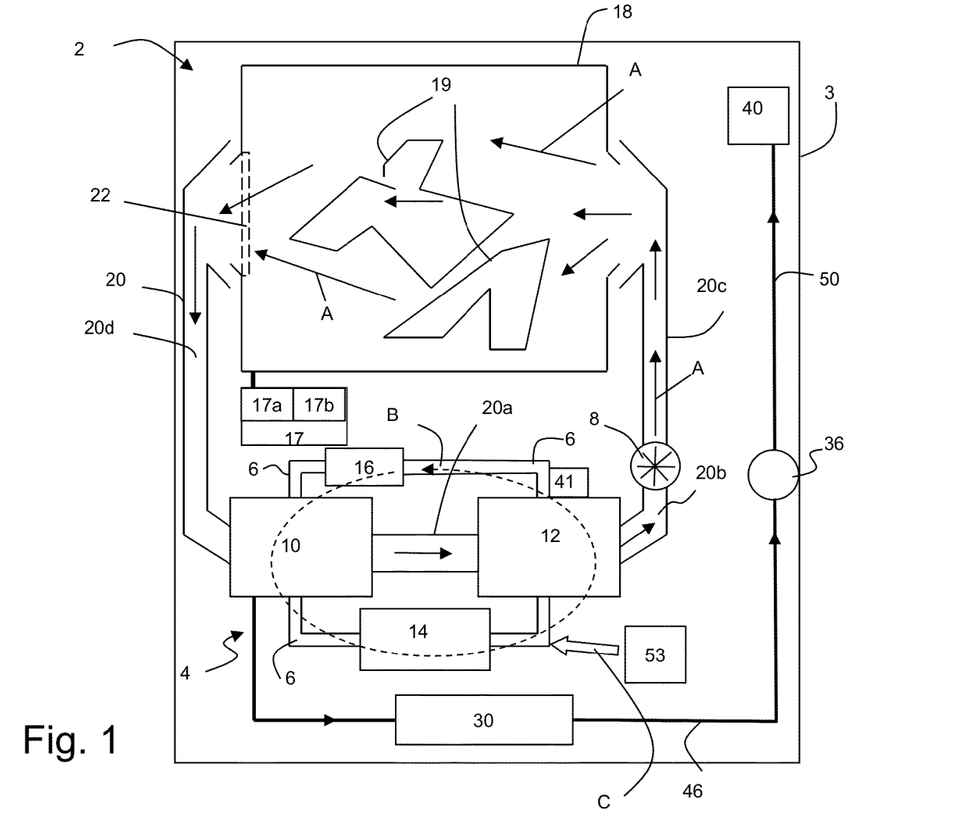
FIG. 1 a schematic view of a laundry treatment apparatus.

FIG. 1 shows a schematically depicted laundry treatment apparatus 2 which in this embodiment is a heat pump tumble dryer. The tumble dryer 2 comprises a heat pump system 4, including a closed refrigerant loop 6 which comprises in the following order of refrigerant flow B: a first heat exchanger 10 acting as evaporator for evaporating the refrigerant and cooling process air, a compressor 14, a second heat exchanger 12 acting as condenser for cooling the refrigerant and heating the process air, and an expansion device 16 from where the refrigerant is returned to the first heat exchanger 10. Together with the refrigerant pipes connecting the components of the heat pump system 4 in series, the heat pump system forms the refrigerant loop 6 through which the refrigerant is circulated by the compressor 14 as indicated by arrow B.

The process air flow within the treatment apparatus 2 is guided through a compartment 18 of the home appliance 2, i.e. through a compartment for receiving articles to be treated, e.g. a drum 18. The articles to be treated are textiles, laundry 19, clothes, shoes or the like. The process air flow is indicated by arrows A in FIG. 1 and is driven by a process air blower 8. The process air channel 20 guides the process air flow A outside the drum 18 and includes different sections, including the section forming the battery channel 20a in which the first and second heat exchangers 10, 12 are arranged. The process air exiting the second heat exchanger 12 flows into a rear channel 20b in which the process air blower 8 is arranged. The air conveyed by blower 8 is guided upward in a rising channel 20c to the backside of the drum 18. The air exiting the drum 18 through the drum outlet (which is the loading opening of the drum) is filtered by a fluff filter 22 arranged close to the drum outlet in or at the channel 20. The optional fluff filter 22 is arranged in a front channel 20d forming another section of channel 20 which is arranged behind and adjacent the front cover of the dryer 2. The condensate formed at the first heat exchanger 10 is collected and guided to the condensate collector 30.

The drum 18 is driven by a drum motor unit 17 having a motor 17a and a motor powering board 17b. Powering board 17b may be an inverter board which may deliver motor parameters to the control unit 51 (see FIG. 2). Preferably drum motor 17a also drives the process air blower 8 or—alternatively—the blower 8 is provided with a separate motor (not shown). The drum motor control unit 17a is configured to adapt the drum rotation speed and/or drum rotation direction under the control of the control unit 51.

The condensate collector 30 is connected via a drain pipe 46, a drain pump 36 and a drawer pipe 50 to an extractable condensate drawer 40. I.e. the collected condensate can be pumped from the collector 30 to the drawer 40 which is arranged at an upper portion of the apparatus 2 from where it can be comfortably withdrawn and emptied by a user.

Figure 2:
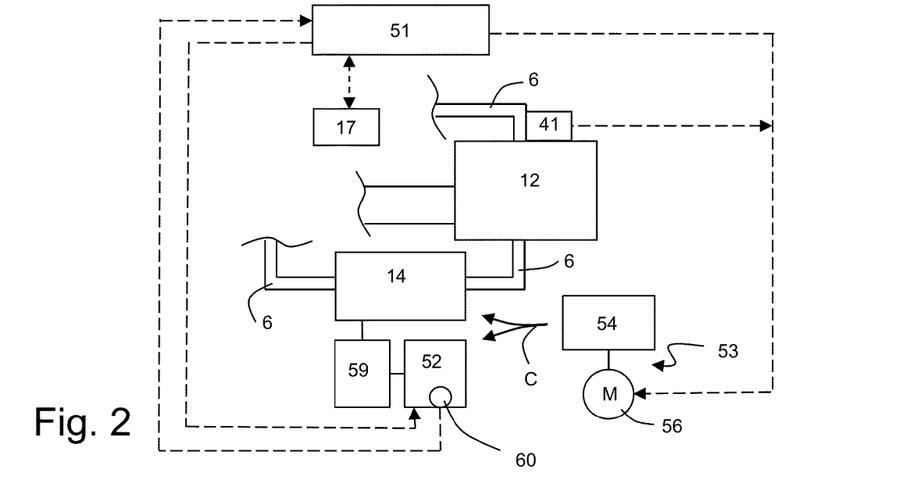

As shown in FIG. 2, a control unit 51 is disposed in the cabinet 3 of the apparatus 2 to control several parts in order to achieve efficient cooling of the compressor 14 and/or its electronic board (i.e. an inverter board 52) containing amongst others an electronic inverter. Alternatively or additionally the control unit 51 is adapted to control cooling of the drum motor drive unit 17 (motor 17a and/or motor powering board 17b). In the following only cooling of the compressor and/or inverter board 51 is described in more detail, however, the described cooling is alternatively or additionally applicable to the cooling of motor drive unit 17. Control unit 51 also controls the above mentioned drain pump 36.

Figure 4:
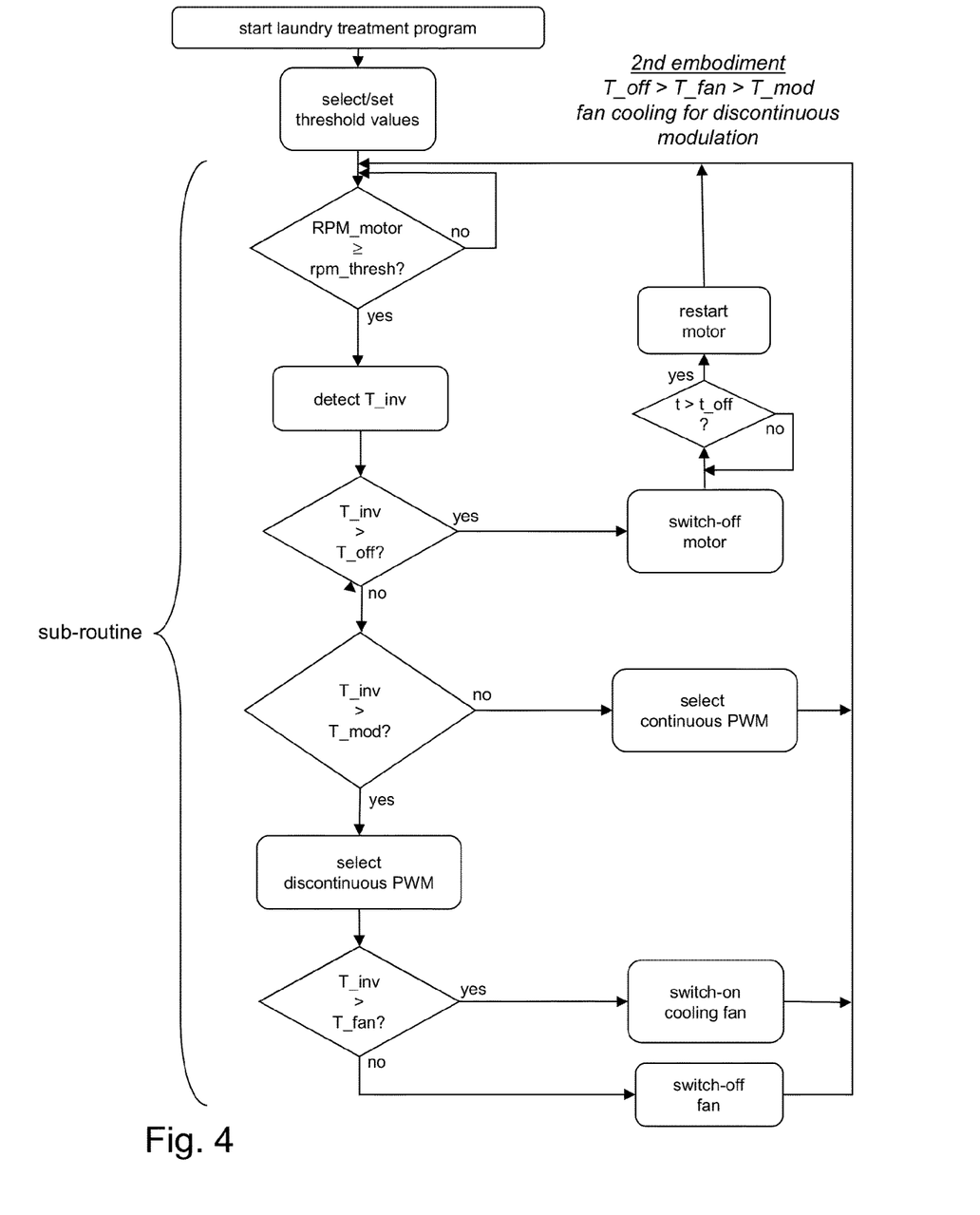
Figure 5:
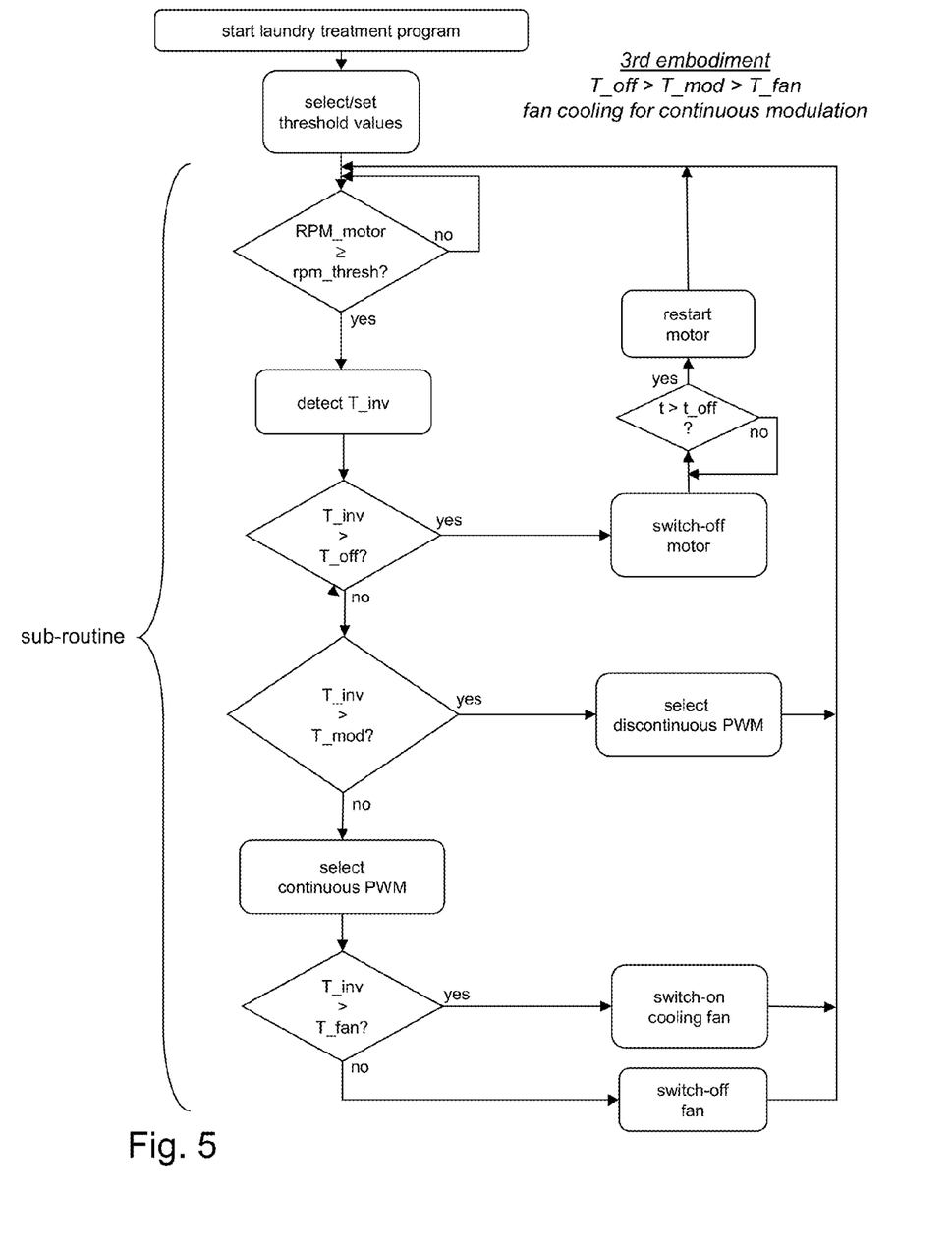

The control unit 51 controls an optional cooling fan unit 53. This cooling fan unit 53 comprises a blower 54 and a motor 56 for driving the blower 54. The cooling fan unit 53 is arranged for cooling the compressor 14 and/or for cooling its inverter board 52, particularly the mentioned electronic inverter as part of the inverter board 52. Usually, cooling the inverter board 52, particularly its inverter, occurs automatically by the cooling air flow C which is generated for cooling the compressor 14 according to the specific cooling requests in several operation modes (FIGS. 4, 5). However, in some operation modes it is not necessary to cool the compressor 14 and consequently also the inverter board 52 and particularly its inverter are not cooled. However, a cooling of the inverter board 52 could be desired, even if the compressor 14 is not cooled or does not need cooling for optimum operation. For implementing such a desired cooling of the inverter board 52 under the control of the control unit 51, the control unit 51 is configured to control the cooling fan unit 53 and/or a compressor motor 59 which is powered by the inverter board 52 and is driving the compressor 14. In this embodiment the inverter board 52 is provided with a board temperature sensor 60 that sends its temperature signal T_inv to the control unit 51.

The cooling air C conveyed by the cooling air blower 54 is entering the cabinet or housing 3 of the dryer 2 through one or more ambient air inlet openings (not shown). For example a cooling air inlet is provided at the lower bottom region at the base section of the housing 3. One or more outlet openings (not shown) for discharging cooling air are provided at the dryer housing 3, for example at the bottom of base section 5 and/or at an upper region of the rear cover forming part of housing 3. The blower 54 directs the cooling air flow C mainly towards the compressor 14, however a portion of the air flow and/or the air flow that has passed the compressor circulates within the dryer housing 3 where it induces an air exchange of internal air with ambient air sucked in by the blower. A portion of this cooling air C passes and thus cools the electronic boards (like the electronic board of the control unit 51, the power board 17b for the drum and/or process air blower motor 17a, and/or the inverter 52 for powering the compressor motor 59). In the embodiment of the variable speed compressor, the inverter 52 for powering the variable speed is arranged close to the compressor covering shield and therefore is in the flow path of the cooling air C flown to the compressor 14.

Preferably the control unit 51 is at the same time the control unit for controlling and monitoring the overall operation of the apparatus 2. For example and as shown in FIG. 2, the control unit 51 receives a temperature signal from a temperature sensor 41 which is arranged at the outlet of the second heat exchanger 12 (condenser) and which is indicative of the refrigerant temperature at that position.

Figure 3:
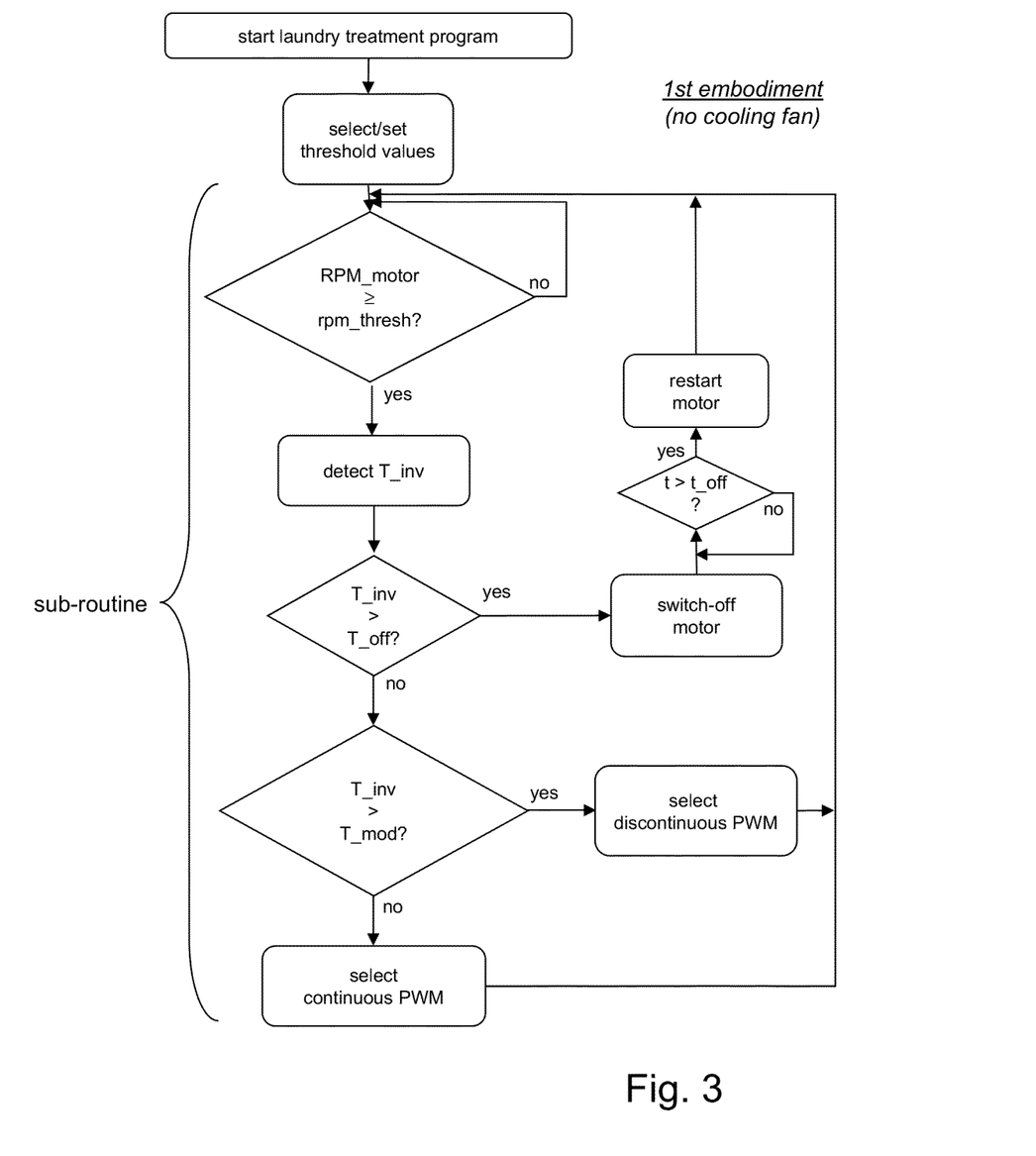

FIG. 3 shows a flow chart of a method for operating a laundry treatment apparatus according to a first embodiment which is exemplified here for the tumble dryer 2. The embodiment of FIG. 3 is directed to operating a heat pump dryer as described with respect to FIG. 1, wherein the method of FIG. 3 may be applied to a heat pump dryer which does not comprise a cooling fan unit 53 (or comprises a disabled fan unit 53) as described above.

The following methods are described with respect to selecting a power supply modulation mode for the variable speed compressor motor unit 59. According to a preferred embodiment, below described methods of selecting a power supply modulation mode may be applied alternatively or additionally to a variable speed drum motor unit (not depicted) adapted to rotatable drive the drum 18 of the dryer 2.

First a laundry treatment program is started, for example by a user pushing a "start" button of the dryer 2. Subsequently, threshold values T_mod, T_off are selected, for example in dependency of a selected program cycle or option ("FAST", "ECO") or in dependency of a dryer parameter, e.g. an ambient temperature of the dryer 2. All selectable threshold values are stored in a memory of the control unit 51.

Before a power supply modulation mode is selected a (mode selection) starting condition has to be verified. Only if the rotation speed RPM motor of the compressor motor 59 exceeds a predetermined threshold value rpm thresh (e.g. 1200-1300 rpm), an operation parameter T_inv is detected by a detector (here inverter board temperature sensor 60), on basis of which a modulation mode is selected. The detected operation parameter T_inv may be a temperature signal of the compressor inverter board 52 (sensor 60), a temperature signal of an electronic board (not shown) of the control unit 51, a temperature signal of the refrigerant circulating in the heat pump system 4 (e.g. from sensor 41), a temperature signal indicative of an ambient or environment temperature of the dryer 2, or a combination of the afore temperature signals. In particular the temperature signal may be detected at an electronic board or inverter controlling a component of the heat pump system 4 or controlling a drum motor, or a temperature detected at a refrigerant fluid outlet position at the first or second heat exchanger 10, 12, a refrigerant fluid outlet position at the compressor 14, the compressor 14, the expansion device 16, or a position in the process air channel 20.

The detected operation parameter T_inv (the following is an example using T_inv which is the temperature signal from sensor 60 of the inverter board 52) is compared to a switch-off threshold value T_off. If the detected temperature T_inv at the inverter board 51 exceeds the threshold value T_off, the motor 59 is switched-off to prevent damage to the inverter board and thus for the dryer. This safety-switch off is maintained for a predetermined cooling-off time t_off to allow the apparatus components to cool down. After the cooling-off time t_off, the compressor motor 59 is restarted and, depending on the rotation speed RPM_motor of the motor 59, the operation parameter T_inv is detected (again) as described above.

If the detected operation parameter T_inv is less than the switch-off threshold T_off, the detected operation parameter T_inv is compared to a mode threshold value T_mod, whereupon a modulation mode for operating the compressor motor 59 is selected as described below.

The inverter motor control is configured to drive the compressor motor 59 by applying different drive signals that depend on the modulation mode used by the control algorithm. In the embodiment there are provided two modulation modes for controlling an electric motor (applicable for driving motors 59 and/or 17a): continuous PWM mode and discontinuous PWM mode (PWM=Pulse Width Modulation).

In a continuous PWM modulation (FIG. 6), the 'duty cycle' of the PWM signal varies according to a sinusoidal path having a constant medium value, while in a discontinuous modulation (FIGS. 7a-b) the duty cycle of the PWM signal varies with a path formed by a plurality of sinusoidal paths having different medium values.

Figure 6:
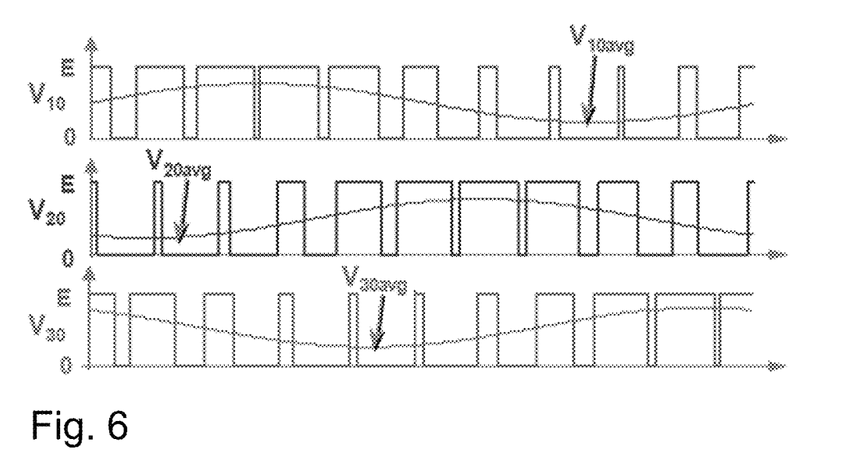

It is known from motor controlling, that continuous modulation allows creating a better current waveform for the motor, with a reduced harmonic content over the fundamental at the cost of a greater power heating dissipation on inverter components. FIG. 6 shows an exemplary continuous PWM mode applicable to any of the described variable speed motor units. As shown in FIG. 6 (and FIGS. 7*a-b*) PWM uses a rectangular pulse wave whose pulse width is modulated over time resulting in the variation of the average value of the waveform. In particular voltage regulation is achieved by varying the ratio of on-to-off time. Each change of the rectangular wave from low state (value=0) to high state (value=E) and vice versa corresponds to an inverter switch being switched-on and -off, respectively. The diagrams of FIG. 6 show a continuous PWM mode, wherein the three diagrams show the average voltages $V_{10avg}$, $V_{20avg}$, $V_{30avg}$ of the three phases applied to the respective windings of a motor unit. As shown in FIG. 6, the resulting average value waveforms $V_{10avg}$, $V_{20avg}$, $V_{30avg}$ are sinusoidal.

Figure 7A:
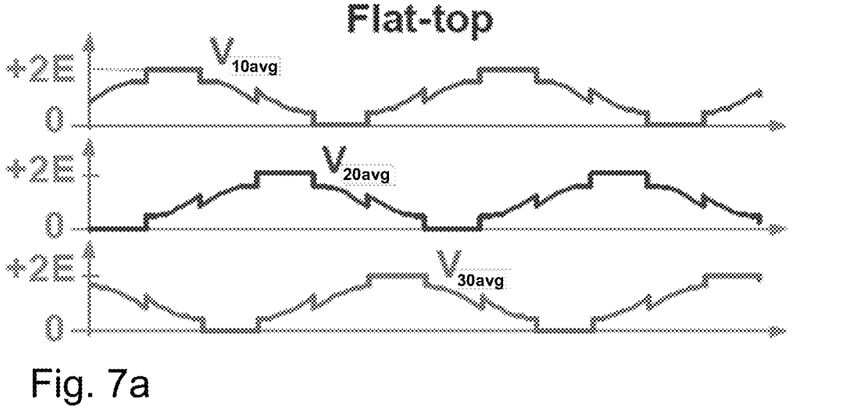
Figure 7B:
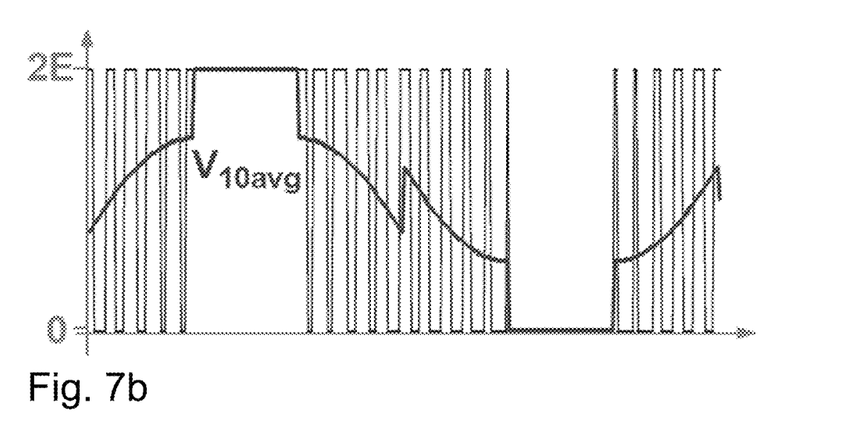

Discontinuous PWM modulation, conversely, can reduce a lot the heat produced (and consequently also the dimensions of the heat sink needed) but it introduces motor noise and a certain amount of harmonic content that can imply a not perfectly sinusoidal current and in consequence a torque ripple on the motor, i.e. a periodic but non-harmonic or sinusoidal increase or decrease in output torque as the output motor shaft rotates. Torque ripple is measured as the difference in maximum and minimum torque over one complete revolution, generally expressed as a percentage. When a motor is operated by discontinuous PWM mode, the reduction of heat produced by the inverter is due to the fact that each switch stays closed for a longer time compared to the continuous PWM mode. Since the power losses are due to current conduction across the switch plus the losses due to the OFF/ON and ON/OFF commutation of the switch, when a discontinuous PWM mode is operating, the commutation losses are reduced compared to the continuous PWM mode and therefore the overall power losses are reduced.

FIGS. 7*a-b* show diagrams, which illustrate an exemplary discontinuous PWM mode applicable to any of the described variable speed motor units. As described above with respect to FIG. 6, the three diagrams shown in FIG. 7*a* illustrate the voltages $V_{10avg}$, $V_{20avg}$, $V_{30avg}$ of the three phases applied to the respective windings of a motor unit. The average value waves $V_{10avg}$, $V_{20avg}$, $V_{30avg}$ are generated by modulating the width of a rectangular pulse wave over time. FIG. 7*b* shows an enlarged portion of the first diagram of FIG. 7*a*, wherein the modified rectangular pulse wave $V_{10}$ (duty cycle) is additionally depicted. When operating a motor unit in discontinuous PWM mode, the resulting average waves are not perfectly sinusoidal, which results in increased torque ripple—cf. $V_{10\text{-}30avg}$ shown in FIG. 7*a*. In contrast to the continuous PWM mode, the respective switch of the inverter is kept in a switched-on (or switched-off) position for an extended period of time. As ON/OFF and OFF/ON switching operations are reduced, less heat is generated during operating a motor unit in discontinuous PWM mode.

The above described differences of the rectangular pulse widths (switch-on/-off times) of the continuous PWM mode (FIG. 6) and the discontinuous PWM mode (FIG. 7*b*) are not shown in FIG. 6 and FIG. 7*b* as the PWM modes are shown for different period sizes.

Figure 8:
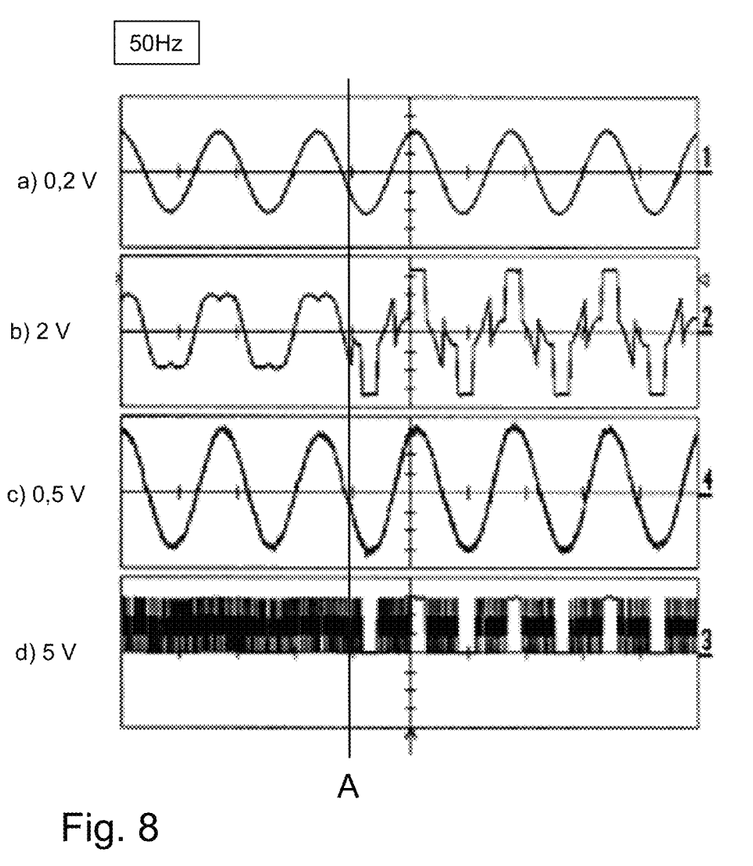

FIG. 8 shows diagrams a)-d) which illustrate a single phase modulation change from continuous PWM (left to the vertical line A) to discontinuous PWM (right to the vertical line A) for different output power levels. The lowermost graph d) illustrates the above described change of switching operation when passing from continuous PWM to discontinuous PWM. I.e. in comparison to continuous PWM mode, an inverter switch remains switched-on and switched-off for a longer period of time in discontinuous PWM mode whereby power losses are reduced.

As shown in FIG. 3, if the detected operation parameter T_inv is below the mode threshold value T_mod, a continuous PWM mode is selected for driving the motor 59. If the detected operation parameter T_inv exceeds the mode threshold value T_mod, the discontinuous PWM mode is selected.

In this embodiment, the above described subroutine (starting with comparing RPM motor to rpm thresh) is continuously run through during an executed drying program. Thus the modulation mode is continuously adapted to actual requirements of the running treatment program.

As described above, by driving the compressor motor 59 in discontinuous PWM mode, less heat is produced by the inverter. Thus, the above described method provides an improved electronic board/components temperature limitation strategy.

Alternatively (not depicted) the operation parameter is only detected once at the beginning of a drying cycle to select the continuous PWM mode or discontinuous PWM mode, which are subsequently applied throughout the executed/selected program cycle. In particular a power supply modulation mode may be selected depending on a selected program option. For example, if a user selects a program option or cycle "ECO" (low-energy consumption), the control unit 51 is adapted to select (power-saving) discontinuous PWM mode to be executed throughout the selected program cycle. Another example for a detected operation parameter would be the selection of a silent "NIGHT" option. Then the control unit 51 would be adapted to select (less noisy) continuous PWM mode to be executed throughout the selected program cycle.

FIG. 4 shows a flow chart illustrating a second embodiment for operating a dryer 2 as shown in FIGS. 1 and 2. In contrast to the above described method of FIG. 3, this method uses the cooling fan unit 53 for cooling the compressor 14 and/or inverter board 52.

In comparison to the above method of FIG. 3, the method of FIG. 4 comprises an additional step: after a discontinuous PWM mode is selected, the detected operation parameter T_inv is compared to a fan threshold value T_fan.

In case the detected operation parameter T_inv is less than the fan threshold value T_fan, the cooling fan unit 53 is switched-off (or remains switched-off). If the operation parameter T_inv exceeds the fan threshold value T_fan, the cooling fan unit 53 is switched-on to cool the inverter board 52—additionally to operating the compressor 59 in power-saving discontinuous PWM mode. Thus temperature limitation on the inverter board 52 is maximized.

As described above, the detected operation parameter T_inv is continuously or repeatedly compared to the threshold values T_off, T_mod, T_fan during an executed drying program. Thus the temperature limitation on the inverter board 52 is continuously adapted to the present (temperature) state of the dryer 2.

FIG. 5 shows a flow chart illustrating a third embodiment for operating a dryer 2 as shown in FIGS. 1 and 2. Similar to the method of FIG. 4, the cooling fan unit 53 is used for cooling e.g. the inverter board 52.

In contrast to the method of FIG. 4, the method of FIG. 5 provides additional cooling by means of the cooling fan unit 53 when a continuous PWM mode is selected. Thus the method provides that prior to applying power-saving discontinuous PWM to the compressor motor 59, the (compressor 59 and) inverter 52 is cooled by fan unit 53. Thereby it is provided that torque ripple and therefore noise generation is kept a minimum level. For example this method may be applied for a silent "NIGHT" program.

When comparing the threshold values of the embodiment of FIG. 4 and FIG. 5, the following relations are given:

$$T\_off > T\_fan > T\_mod \text{ (FIG. 4), and}$$

$$T\_off > T\_mod > T\_fan \text{ (FIG. 5).}$$

Unless otherwise mentioned, the steps and features of the above described methods of FIGS. 3, 4 and 5 may be exchanged in any arbitrary manner.

| Reference Numeral List | | | |
|---|---|---|---|
| 2 | tumble dryer | 41 | temperature sensor |
| 3 | housing/cabinet | 46 | drain pipe |
| 4 | heat pump system | 50 | drawer pipe |
| 6 | refrigerant loop | 51 | control unit |
| 8 | blower | 52 | inverter board |
| 10 | first heat exchanger | 53 | cooling fan unit |
| 12 | second heat exchanger | 54 | blower |
| 14 | compressor | 56 | fan motor |
| 16 | expansion device | 59 | compressor motor |
| 17 | motor control unit | 60 | board temperature sensor |
| 17a | drum motor | | |
| 17b | motor drive board | A | process air flow |
| 18 | drum | B | refrigerant flow |
| 19 | laundry | C | cooling air flow |
| 20 | process air channel | RPM_motor | rotation speed compressor motor |
| 20a | battery channel | | |
| 20b | rear channel | T_mod | first threshold value/mode threshold value |
| 20c | rising channel | | |
| 20d | front channel | T_off | second threshold value/switch-off threshold value |
| 22 | filter element | | |
| 30 | condensate collector | T_fan | third threshold value/fan threshold value |
| 36 | drain pump | | |
| 40 | condensate container | rpm_thresh | fourth threshold value |

The invention claimed is:

1. A method of operating a laundry treatment apparatus, in particular a washing machine, a laundry dryer, a heat pump laundry dryer or a washing machine having a drying function, wherein the apparatus comprises:
   a control unit controlling the operation of the treatment apparatus,
   a laundry treatment chamber for treating laundry,
   a detector unit for detecting at least one operation parameter of the treatment apparatus, and
   a first variable speed motor unit adapted at least to drive the treatment chamber and/or
   a compressor having a second variable speed motor unit for circulating a refrigerant fluid through a refrigerant loop of the laundry treatment apparatus,
   wherein the method comprises:
      selecting a predetermined power supply modulation mode for operating at least one of the first and second motor unit in dependency of the at least one detected operation parameter, and
      operating at least one of the first and second motor units in an operating cycle by applying or executing the selected predetermined power supply modulation mode,
   further wherein: a first modulation mode is selected when the apparatus operation parameter is below a first threshold value, and a second modulation mode is selected when the apparatus operation parameter is equal to or higher than the first threshold value.

2. A method according to claim 1, wherein the first and second modulation modes are selected from continuous mode pulse-width modulation (sinusoidal PWM/SPWM) and discontinuous mode pulse-width modulation (DPWM), or wherein the first modulation mode is a continuous mode pulse-width modulation (sinusoidal PWM/SPWM) and the second modulation mode is a discontinuous mode pulsewidth modulation (DPWM).

3. A method according to claim 1, wherein the control unit comprises an electronic board having an inverter electronic supplying controlled current to the first or second motor unit according to the selected modulation mode.

4. A method according to claim 1, wherein at least one motor unit is switched-off when the or a detected apparatus operation parameter is above a second threshold value.

5. A method according to claim 1, wherein a cooling fan unit for cooling an electronic board of the treatment apparatus is activated when the or a detected apparatus operation parameter is above a further threshold value.

6. A method according to claim 5, wherein:
   when the value of motor speed of the first/second motor unit is above a still futher threshold value or within a predetermined value range, the selection of a predetermined modulation mode for operating at least one motor unit in dependency of the at least one detected operation parameter is initiated/started, and
   when the value of motor speed of the first/second motor unit is below the still further threshold value or outside the predetermined value range, the first/second motor unit is operated in an initial modulation mode, in particular in continuous PWM.

7. A method according to claim 1, wherein the selection of a predetermined modulation mode for operating at least one motor unit in dependency of the at least one detected operation parameter is started/initiated/enabled, and/or wherein the value or level of the first threshold value is adjusted, depending on one or more of the following parameters:
   the apparatus operation parameter;
   a drying program selector position;
   a program option selection;
   a drying program step;
   a drying process parameter;
   a laundry status;
   an ambient temperature;
   a time elapsed from the beginning of a laundry treatment cycle;
   a working parameter of the laundry treatment chamber, in particular laundry drum;
   a working parameter of a process air fan unit;
   a working parameter of a heat pump system;
   a motor unit working parameter;
   a user selection;
   a previous operation time of the laundry treatment apparatus; and
   an electrical parameter of the treatment apparatus power supply.

8. A method according to claim 1, wherein the detected operation parameter indicates at least one of the following:
   an operating state of an electronic board,
   an operating state of a heat pump system of the treatment apparatus, and
   a temperature state of the treatment apparatus.

9. A method according to claim 1, wherein at least one of the following operation parameters:
   an electronic board temperature,
   a motor temperature detected via the electronic board, and
   a current delivered by the electronic board to a motor exceeding a threshold value or exceeding a threshold averaged value, is detected using a secondary operation parameter of an electronic board indicative of the operation parameter, wherein the secondary operation parameter includes one or more of:
- a voltage detected on the electronic board,
- a power or an averaged power provided by the electronic board,
- a current detected on the electronic board, and
- a voltage ratio detected on the electronic board.

10. A method according to claim 1, wherein the detected operation parameter is selected from one of the following variables:
- a temperature signal of an electronic board of the control unit,
- a temperature signal of a refrigerant circulating in a heat pump system,
- a temperature signal indicative of an ambient or environment temperature of the laundry treatment apparatus, and
- a combination of the afore temperature signals.

11. A method according to claim 10, wherein the at least one of the detected temperature signals corresponds to a temperature detected at one of the following positions:
- an electronic board or inverter position of an electronic board or inverter controlling a component of the heat pump system,
- an electronic board or inverter position of an electronic board or inverter controlling a motor for driving the laundry treatment chamber being a drum,
- a refrigerant fluid outlet position at the first or second heat exchanger,
- a refrigerant fluid outlet position at the compressor,
- the compressor,
- the expansion device, and
- a position in the air flow of the process air.

12. A laundry treatment apparatus, in particular a washing machine, a laundry dryer, a heat pump laundry dryer or a washing machine having a drying function, wherein the apparatus comprises:
- a control unit controlling the operation of the treatment apparatus,
- a laundry treatment chamber for treating laundry, and
- a detector unit for detecting at least one operation parameter (T inv) of the treatment apparatus,
- wherein the apparatus further comprises:
  - a first variable speed motor unit adapted to rotate the treatment chamber, and/or
  - a compressor having a second variable speed motor unit for circulating a refrigerant fluid through a refrigerant loop of the treatment apparatus,
- wherein the control unit is adapted to control the operation of the laundry treatment apparatus according to the method of claim 1.

13. A method of operating a laundry treatment apparatus, in particular a washing machine, a laundry dryer, a heat pump laundry dryer or a washing machine having a drying function, wherein the apparatus comprises:
- a control unit controlling the operation of the treatment apparatus,
- a program or program option selection unit,
- a laundry treatment chamber for treating laundry,
- a detector unit for detecting at least one operation parameter of the treatment apparatus, and
- a variable speed motor unit adapted to drive a motor with a variable speed, wherein the variable speed motor unit is adapted to drive the motor by applying a first power supply modulation mode and applying at least a second power supply modulation mode, wherein the modulation type of the first and second power supply modulation mode are different of each other,
wherein the method comprises:
- in dependency of the selected program or program option or in dependency of the at least one apparatus operation parameter, the control unit
  - disables the second power supply modulation mode such that it cannot be applied by the variable speed motor unit, or
  - disables all power supply modulation modes except the first power supply modulation mode such that the variable speed motor unit can only apply the first power supply modulation mode.

14. A method according to claim 13, wherein the variable speed motor unit comprises a motor unit adapted at least to drive the treatment chamber, and/or a variable speed motor unit for operating a compressor circulating a refrigerant fluid through a refrigerant loop of the laundry treatment apparatus.

15. A method according to claim 13, wherein the at least one apparatus operation parameter is one or more of the following:
- a drying program step;
- a drying process parameter;
- a laundry status, the laundry humidity, the laundry load or the laundry type;
- an ambient temperature;
- a time elapsed from the beginning of a laundry treatment cycle;
- a working parameter of the laundry treatment chamber, in particular laundry drum;
- a working parameter of a process air fan;
- a working parameter of a heat pump system;
- a motor unit working parameter;
- a previous operation time of the laundry treatment apparatus; and
- an electrical parameter of the treatment apparatus power supply.

16. A method according to claim 13, wherein the selected program or program option is or is determined by one or more of:
- a drying program selector position;
- a program option selection;
- a user laundry type selection;
- a user selected noise reduction option; and
- a user selected laundry load selection.

17. A method according to claim 13,
wherein the first power supply modulation mode is a continuous PWM mode and the second power supply modulation mode is a discontinuous PWM mode, or
wherein the first power supply modulation mode is a PWM mode in which the pulse modulation results in essentially a continuous power supply to each of the motor windings and the second power supply modulation mode is a PWM mode in which the pulse modulation results in temporal discontinuities in the power supply to at least one or each one of the motor windings.

18. A method of operating a laundry treatment apparatus, in particular a washing machine, a laundry dryer, a heat pump laundry dryer or a washing machine having a drying function, wherein the apparatus comprises:
- a control unit controlling the operation of the treatment apparatus,
- a laundry treatment chamber for treating laundry,
- a detector unit for detecting at least one operation parameter of the treatment apparatus, and a first variable speed motor unit adapted at least to drive the treatment chamber, and/or a compressor having a second variable speed motor unit for circulating a refrigerant fluid through a refrigerant loop of the laundry treatment apparatus, wherein the method comprises:

selecting a predetermined power supply modulation mode for operating at least one of the first and second motor unit in dependency of the at least one detected operation parameter, and operating at least one of the first and second motor units in an operating cycle by applying or executing the selected predetermined power supply modulation mode, further wherein the selection of a predetermined modulation mode for operating at least one motor unit in dependency of the at least one detected operation parameter is started/initiated/enabled, and/or wherein the value or level of the first threshold value is adjusted, depending on one or more of the following parameters:

an apparatus operation parameter;
a drying program selector position;
a program option selection;
a drying program step;
a drying process parameter;
a laundry status;
an ambient temperature;
a time elapsed from the beginning of a laundry treatment cycle;
a working parameter of the laundry treatment chamber, in particular laundry drum;
a working parameter of a process air fan unit;
a working parameter of a heat pump system;
a motor unit working parameter;
a user selection;
a previous operation time of the laundry treatment apparatus; and
an electrical parameter of the treatment apparatus power supply.

* * * * *